(12) United States Patent  (10) Patent No.: US 9,802,482 B2
Schumacher et al.  (45) Date of Patent: Oct. 31, 2017

(54) METHOD AND SYSTEM FOR DETECTING AND MANAGING AN ELECTRICAL PHASE LOSS CONDITION IN A CLIMATE CONTROLLED TRANSPORT SYSTEM

(71) Applicant: THERMO KING CORPORATION, Minnepaolis, MN (US)

(72) Inventors: Ryan Wayne Schumacher, Bloomington, MN (US); Matthew S. Nelson, Cottage Grove, MN (US); Ashok Muralidhar, Eagan, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 15/087,039

(22) Filed: Mar. 31, 2016

(65) Prior Publication Data
US 2017/0282714 A1 Oct. 5, 2017

(51) Int. Cl.
G08B 21/00 (2006.01)
B60K 28/08 (2006.01)
G08B 21/18 (2006.01)

(52) U.S. Cl.
CPC ............ *B60K 28/08* (2013.01); *G08B 21/185* (2013.01)

(58) Field of Classification Search
CPC ........... B60K 28/08; G01R 29/18; H02H 7/09
USPC ................................ 340/457, 657, 658, 663
See application file for complete search history.

(56) References Cited

U.S. PATENT DOCUMENTS

| 5,337,206 A * | 8/1994 | Kadah ...................... H02H 7/09 361/29 |
| 8,692,398 B2 | 4/2014 | Neddermeyer et al. |
| 2015/0260773 A1* | 9/2015 | Eckholdt .................. H02H 7/09 324/86 |
| 2016/0003885 A1* | 1/2016 | Loke ........................ G01D 3/08 324/543 |

* cited by examiner

*Primary Examiner* — Toan N Pham
(74) *Attorney, Agent, or Firm* — Hamre, Schumann, Mueller & Larson, P.C.

(57) ABSTRACT

A method for detecting and managing an electrical phase loss condition in a climate controlled transport unit (CCTU) is provided. The method includes monitoring a generator phase signal outputted from a generator of the CCTU. The method also includes calculating, via a CCTU controller, a phase shift amount based on the generator phase signal. Also, the method includes detecting an electrical phase loss condition based on the phase shift amount.

19 Claims, 9 Drawing Sheets

METHOD AND SYSTEM FOR DETECTING AND MANAGING AN ELECTRICAL PHASE LOSS CONDITION IN A CLIMATE CONTROLLED TRANSPORT SYSTEM

FIELD

Embodiments of this disclosure relate generally to a climate controlled transport unit (CCTU). More specifically, the embodiments relate to a method and system for detecting and managing an electrical phase loss condition in a CCTU.

BACKGROUND

A climate controlled transport unit (CCTU) is generally used to control an environmental condition and includes an environmental-control system and a compartment. Exemplary CCTUs can include, for example, a climate controlled container (e.g., a climate controlled container on a flat car, a climate controlled intermodal container, etc.), a climate controlled truck, a climate controlled box car, an auxiliary power unit (APU), an external combustion device, a climate controlled bus, a climate controlled railway car, etc. The compartment can take the form of multiple compartments or have multiple zones. In some embodiments, the CCTU can include one or more of a refrigeration system, a heating system, a humidity system, and an air-quality system. In some embodiments, the CCTU can include one or more of a refrigeration system, a heating system, a humidity system, and an air-quality system. In some embodiments, the CCTU can include a heating, ventilating, air conditioning, and refrigeration (HVACR) system.

SUMMARY

Embodiments of this disclosure relate generally to a CCTU. More specifically, the embodiments relate to a method and system for detecting and managing an electrical phase loss condition in a CCTU.

In one embodiment, a method for detecting and managing an electrical phase loss condition in a CCTU is provided. The method includes monitoring a generator phase signal outputted from a generator of the CCTU. The method also includes calculating, via a CCTU controller, a phase shift amount based on the generator phase signal. Also, the method includes detecting an electrical phase loss condition based on the phase shift amount.

In another embodiment, an electrical phase loss detection system for a CCTU is provided. The electrical phase loss detection system includes a generator, a current sensor and a controller. The generator is configured to output a generator phase signal. The current sensor is configured to monitor a generator phase signal outputted by the generator. The controller is configured to detect an electrical phase loss condition based on the generator phase signal.

In yet another embodiment, a CCTU is provided. The CCTU includes a transport unit, a transport refrigeration system (TRS), a prime mover, a generator, a current sensor and a controller. The TRS is configured to control an environmental condition within the transport unit. The TRS can include, for example, a vapor compression refrigeration system, a cryogen based refrigeration system, a eutectic based refrigeration system, a heat plate refrigeration system, etc.

The prime mover is configured to power the TRS. The generator is configured convert mechanical energy generated by the prime mover into electrical energy. The electrical energy is outputted as a generator phase signal. The current sensor is configured to monitor the generator phase signal outputted by the generator. The controller is configured to detect an electrical phase loss condition based on the generator phase signal.

In some embodiments, a CCTU includes a generator to provide three phase electrical power to one or more loads in the CCTU. When the generator or wiring connected to the generator lose a single phase of the three phase electrical power, the CCTU can still operate but will have difficulty in operating at its full capacity. That is, loss of a single phase of the three phase electrical power can result in loads of the CCTU from being able to function properly or the providing insufficient torque to get a prime mover of the CCTU from restarting. This can result in lost cargo if the CCTU is not capable of keeping up with the demands required by the CCTU.

An advantage of these embodiments is that a controller of the CCTU can determine when an electrical phase loss occurs and execute an electrical phase loss management procedure that can alert the operator that the CCTU may not be capable of operating at its fully capacity and prevent an undesirable shutdown and/or restart event that could result in the CCTU from being unable to maintain a desired environmental condition that could lead to lost cargo. The embodiments described herein can also remove a frequency dependency when determining whether an electrical phase loss condition has occurred.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Embodiments of this disclosure relate generally to a CCTU. More specifically, the embodiments relate to a method and system of detecting and managing an electrical phase loss condition in a CCTU.

The embodiments described herein relate to a CCTU having an environmental-control system and a compartment. Exemplary CCTUs can include, for example, a climate controlled container (e.g., a climate controlled container on a flat car, a climate controlled intermodal container, etc.), a climate controlled truck, a climate controlled box car, an auxiliary power unit (APU), an external combustion device, a climate controlled bus, a climate controlled railway car, etc. The compartment can take the form of multiple compartments or have multiple zones. In some embodiments, the CCTU can include one or more of a refrigeration system, a heating system, a humidity system, and an air-quality system. In some embodiments, the CCTU can include a transport refrigeration system (TRS). Also, in some embodiments, the CCTU can include a heating, ventilating, air conditioning, and refrigeration (HVACR) system. The CCTU can be managed, controlled and regulated using a CCTU controller.

A "transport refrigeration system" (TRS) includes, for example, a refrigeration system for controlling the refrigeration of an interior space of a refrigerated transport unit. The TRS may be a vapor-compressor type refrigeration system, or any other suitable refrigeration system that can use refrigerant, cold plate technology, cryogen or the like.

A "refrigerated transport unit" includes, for example, a refrigerated container (e.g., a container on a flat car, an intermodal container, etc.), a truck, a box car, or other similar transport unit.

A "CCTU controller" includes, for example, an electronic device that is configured to manage, command, direct, and regulate the behavior of one or more CCTU refrigeration components of a refrigeration circuit (e.g., an evaporator, a condenser, a compressor, an expansion valve (EXV), an electronic throttling valve (ETV), etc.), a generator, a standby electric drive motor, an alternator, a current sensor, etc.

In one implementation, a CCTU has a multiphase generator or alternator, such as a three-phase generator. The CCTU can incorporate a current sensor to monitor all three phases of the high-voltage alternating current (AC) bus from the generator. Each of the phases are routed through the current sensor with a differing turn ratio, and as such do not cancel. The output of the current sensor can be a digital signal, which can then be analyzed to detect an electrical phase loss condition.

Figure 1:
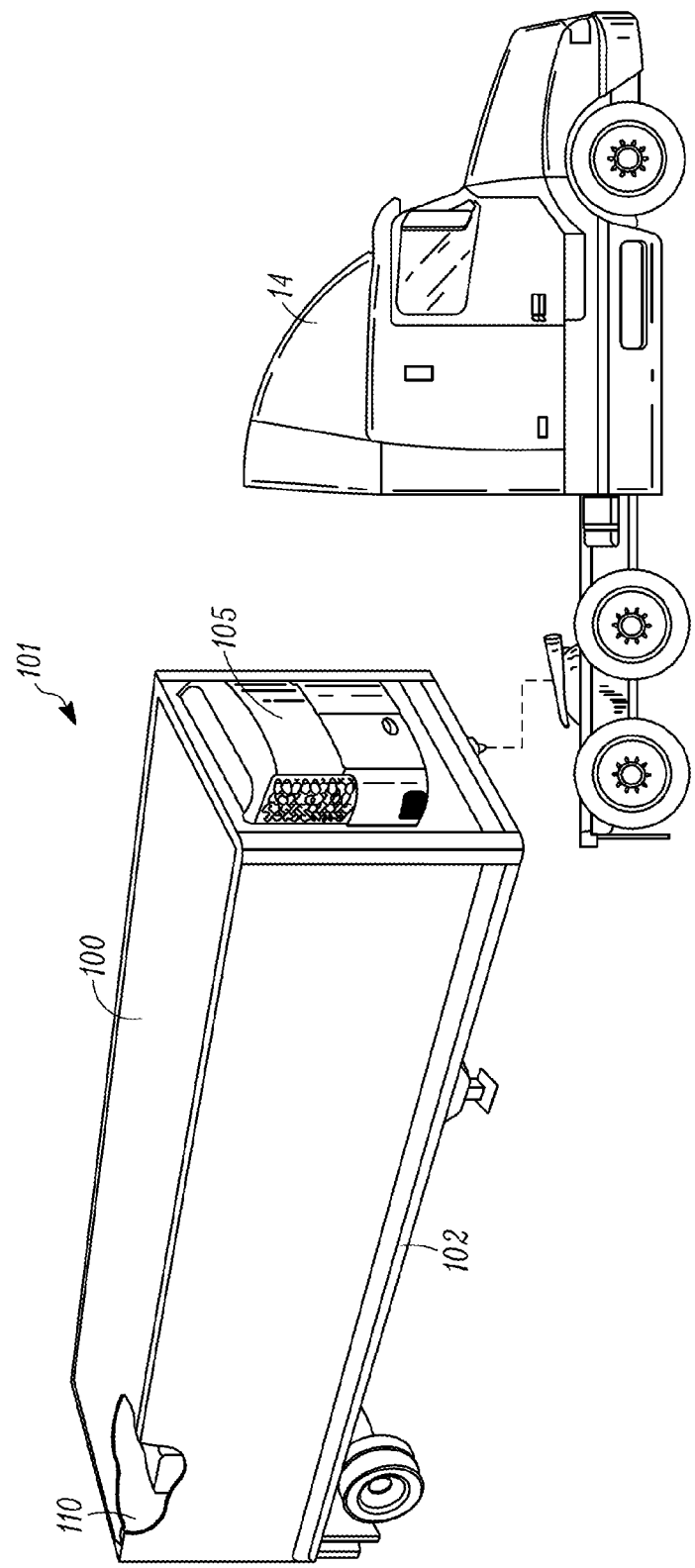
FIG. 1 is a perspective view of an over-the-road tractor and semi-trailer, according to one embodiment.

In the embodiment shown in FIG. 1, the CCTU is an over-the-road refrigerated semi-trailer 100 having a transport refrigeration system 101. The trailer 100 includes a chassis 102 supporting (or forming) a single compartment 110 cooled by a transport refrigeration unit (TRU) 105 of the TRS 101. The chassis 102 also supports the TRU 105. Other embodiments can relate to a vehicle having an alternator and a high-voltage AC bus, or even a generator having a high-voltage AC bus. Exemplary vehicles include automobile, marine, and aerospace vehicles.

Figure 2:
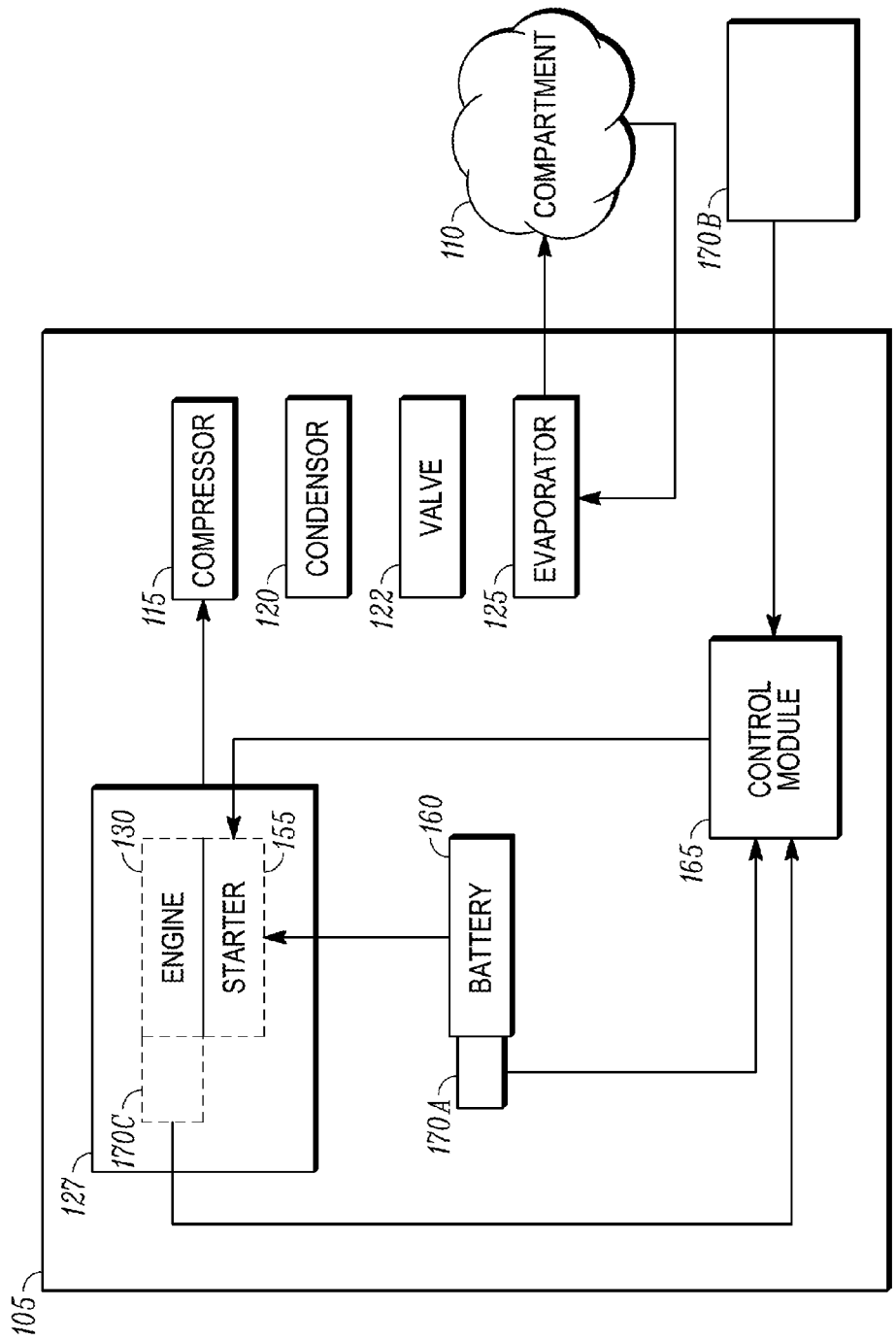
FIG. 2 is a block diagram of a transport refrigeration unit, according to one embodiment.

FIG. 2 illustrates one embodiment a TRU 105 that can be used, for example, in the TRS 101 shown in FIG. 1. The TRU 105 includes a compressor 115, a condenser 120, an expansion valve 122, and an evaporator 125. The TRU 105 is powered from an internal combustion engine 130 of a power module 127. The power module 127 can also include, for example, a belt-driven generator to provide power to high power system loads, a belt-driven alternator to provide power to low power system loads, etc. For example, the compressor 125 can be driven by an electronically-controlled motor powered by a belt-driven generator having a governed internal combustion engine 130. The power module 127 can be configured to provide, for example, AC electrical power, DC electrical power, etc. to components of the TRU 105 (e.g., the compressor 115, one or more condenser fans of the condenser 120, one or more solenoid valves 122, one or more evaporator blowers of the evaporator 125, the control module 165, etc.).

For the described embodiment, a CCTU can be controlled in a "cycle" mode, which starts the engine 130 when a parameter is out of range and stops the engine 130 when the parameter is within range. The parameter may be, for example, a battery voltage, a compartment temperature, a compartment humidity, a compartment air quality, an engine temperature, etc. In one specific example, the engine 130 starts after the compartment temperature rises above a first temperature value and stops after the compartment temperature falls below a second temperature value, which may be the same as the first temperature value.

Continuing to refer to FIG. 2, a starter 155 can be powered by a battery 160 and can be controlled in response to a signal from a CCTU controller 165. The CCTU controller 165 can also receive a signal from a sensor 170. The signal can have a value having a relation to the sensed parameter. For example, the sensor 170A can be a voltage sensor and the signal can have a relation to the voltage of the battery. As another example, the sensor 170B can be a temperature sensor and the signal can have a relation to the temperature of the compartment 110. In another example, the sensor 170C can be a high-voltage AC bus sensor and the signal can have a relation to an electrical parameter of the high-voltage AC bus.

Before proceeding further, it should be understood that while the CCTU controller 165 is discussed herein as a single part. However in other embodiments, the CCTU controller 165 can comprise multiple parts.

Figure 3:
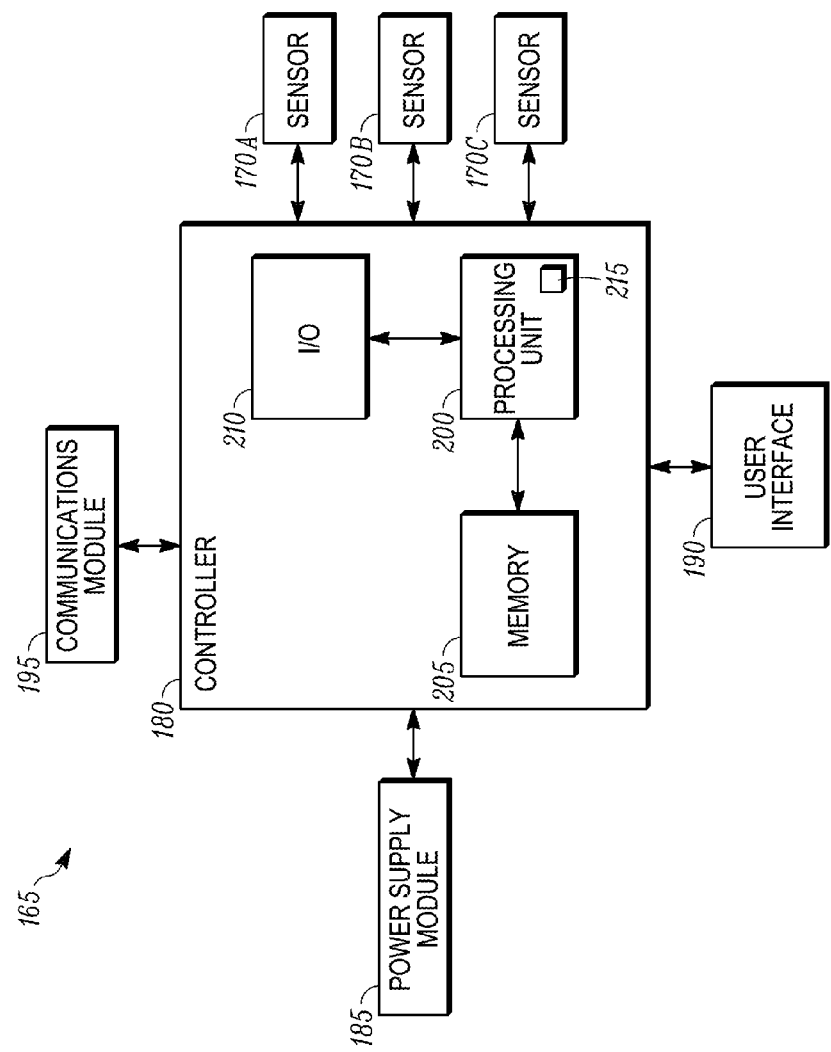
FIG. 3 is a block diagram of a CCTU controller, according to one embodiment.

FIG. 3 illustrates one example of a CCTU controller 300 that can be provided, for example, in the TRU 105. The CCTU controller 300 includes, among other things, a control module 180, a power supply module 185, a user interface module 190, and a communications module 195. The control module 180 includes combinations of software and hardware that are operable to, among other things, control the operation of the TRS 101, including components within the TRU 105. In one construction, the control module 180 includes a printed circuit board ("PCB") that is populated with a plurality of electrical and electronic units that provide power, operational control, and protection to the CCTU controller 300. In some embodiments, the PCB includes, for example, a processing unit 202 (e.g., a microprocessor, a microcontroller, digital signal processor, or another suitable programmable device), a memory unit 205, and a bus 220. The bus 220 connects various components of the PCB including the memory unit 205 to the processing unit 200. The processing unit 202 includes a phase shift counter 215 configured to calculate a phase shift amount between a reference signal and a generator signal. The memory unit 205 can include, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 202 is connected to the memory 205 and can execute software that is capable of being stored in the RAM (e.g., during execution), the ROM (e.g., on a generally permanent basis), or another non-transitory computer readable medium such as another memory or a disc. Additionally or alternatively, the memory unit 205 can be included in the processing unit 202. The control module 180 also includes an input/output ("I/O") unit 210 that includes routines for transferring information between units within the control module 180 and other components of the CCTU controller 300. For example, the communications module 195 is configured to provide communication between the control module 180 and one or more additional devices within a trailer (e.g., the trailer 100) or tractor (e.g., the tractor 14) or external to the trailer or tractor.

Software included in the implementation of the CCTU controller 300 can be stored in the memory unit 205 of the control module 180. The software can include, for example, firmware, one or more applications, program data, one or more program modules, and other executable instructions. The control module 180 is configured to retrieve from memory and execute, among other things, instructions related to the operation and control of a CCTU (e.g., the CCTU 101). For example, the control module 180 can be configured to execute instructions retrieved from memory unit 205 for monitoring the temperature within a compartment (e.g., compartment 110) and for controlling a TRU (e.g., the TRU 105) to control the temperature within the compartment. In other embodiments, the control module 180 or external device includes additional, fewer, or different units.

The PCB can also include, among other things, a plurality of additional passive and active features (not shown) such as resistors, capacitors, inductors, integrated circuits, and amplifiers. These features are arranged and connected to provide a plurality of electrical functions to the PCB including, among other things, filtering, signal conditioning, or voltage regulation. For descriptive purposes, the PCB and the electrical components populated on the PCB are collectively referred to as the control module 180.

The user interface module 190 is included to control the CCTU controller 300 or the operation of the TRU as a whole. The user interface module 190 can be operably coupled to the control module 180 to control, for example, setting the operation of the TRU and communicating faults of the TRU. The user interface module 190 can include combinations of digital and analog input/output devices required to achieve a desired level of interfacing with an operator. For example, the user interface module 190 can include a computing device having a display and input devices, a touch-screen display, a plurality of knobs, dials, switches, buttons, faders, or the like.

Figure 4:
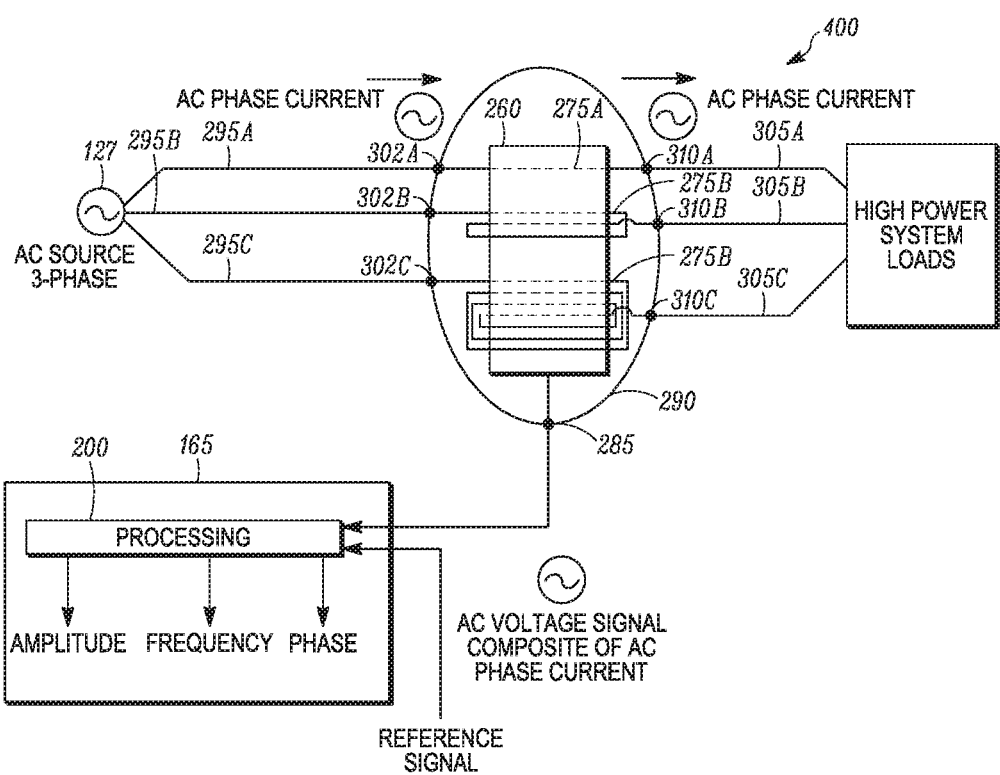
FIG. 4 is a block diagram of a portion of the refrigeration unit of FIG. 2.
Figure 5:
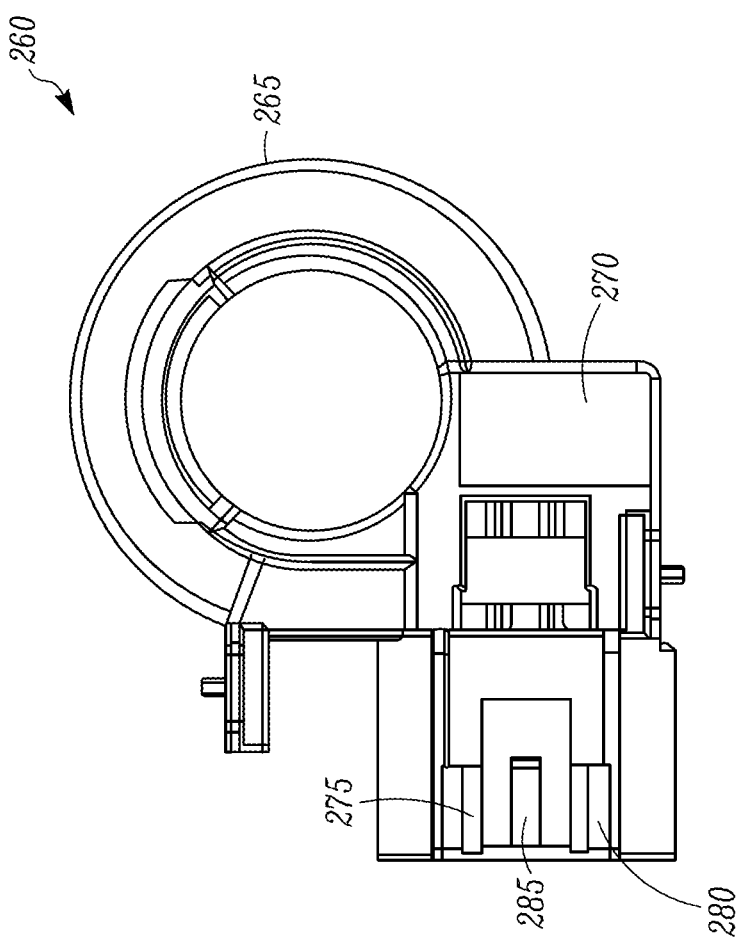
FIG. 5 is a side view of a Hall-Effect Sensor, according to tone embodiment.

Turning now to FIGS. 4-5, one embodiment of a belt-driven generator 400 are schematically represented. The electrical power from the belt-driven generator 400 is provided to the system loads of a TRU (e.g., the TRU 105), as discussed above and as commonly known. However, electrically after the belt-driven generator 400 and before use of the electrical power by the loads, a magnetic field current sensor, such as a Hall Effect sensor 260, or a magnetic flux sensor, such as a fluxgate sensor, can sense the generated phase current from the belt-driven generator 400.

The Hall Effect sensor 260 can be an open-loop or closed-loop sensor. The sensor 260 includes a core 265 and a Hall Effect device 270 (see FIG. 5) interconnected with the core 265. A first conductor 275A leading from a first phase 250A is wound around the core 265 a first number of turns, a second conductor 275B leading from a second phase 250B is wound around the core 265 a second number of turns, and a third conductor 275C leading from a third phase 250C is wound around the core 265 in a third number of turns.

The windings of the first number of turns, the windings of the second number of turns, and the winding of the third number of turns can be in a non-cancelling arrangement. That is the windings can all be wound in a first, common direction (i.e., all clockwise or counterclockwise) and none are wound in a second direction. The number of turns of the first winding, second winding, and third winding may not be equal and can be based on a ratio; i.e., employ differing turn ratios. For example, the ratio may be a one-to-two-to-four (1:2:4) turn ratio. Other ratios are possible, with preferred ratios being chosen such that a resultant phasor signal detected by a current sensor is able to detect an electrical phase loss condition. The Hall Effect device 270 can be configured to monitor all three phases of the high-voltage AC bus. The output of the device 270 is an analog signal, which can be analyzed, for example, by the CCTU controller 300 in terms of amplitude, frequency, and phase. These electrical parameters can determine bus loading and identify fault conditions.

Before proceeding further, it should be understood that, when referring to being wound around the core 265, one of the windings may simply pass through the core. This is still considered to be wound around the core even though it simply passes through the core.

Referring to FIG. 5, the Hall Effect device 270 has three ports 275, 280, and 285. The port 275 receives direct current (DC) supply voltage, the port 280 is coupled to ground, and the port 285 outputs the analog signal. The analog output signal can be provided to a CCTU controller (e.g., the CCTU controller 300) for further analysis.

The Hall Effect sensor 260 can be integrated with wound conductors 275 to create a wire harness 290. The wire harness 290 can include the wound conductors 275 that couple with conductors 295 from a generator at nodes (or junctions) 302. The conductors 275 of the wire harness 290 can couple with conductors 305 leading to the system loads at nodes 310. The wire harness 290 also include nodes 275, 280, and 285 (or ports) as discussed above.

As stated above, the output of the Hall Effect device 270 can be an analog signal, which can be analyzed in terms of amplitude, frequency, phase, etc. For example, the analog signal can be a voltage having a relationship to the current through the Hall Effect sensor 260. The voltage relates to a composite signal of the current of the three phases. That is, the signal relates to an unequally weighted vector summation of the current for the three phases. The signal can include an amplitude, a frequency, and phase sum of the composite phase currents.

A TRS (e.g., the TRS 101) can have known operating conditions for the belt-driven generator 400 and loads. When utilizing a load, like the compressor 115 shown in FIG. 2, the current can be in a known range. The amplitude of the output signal can be compared to a value representative of a properly operating compressor and if the amplitude is within range, then the CCTU controller 300 can confirm that the TRS is operating properly. If the amplitude of the output signal is out of range (e.g., greater than a threshold), then the current is too high for the load and the belt-driven generator 400 can be shut down. The monitored amplitude of the signal can be an RMS value, an averaged value, or a peak value. The alternator's frequency can provide a reference for the phase shift calculation.

Figure 6:
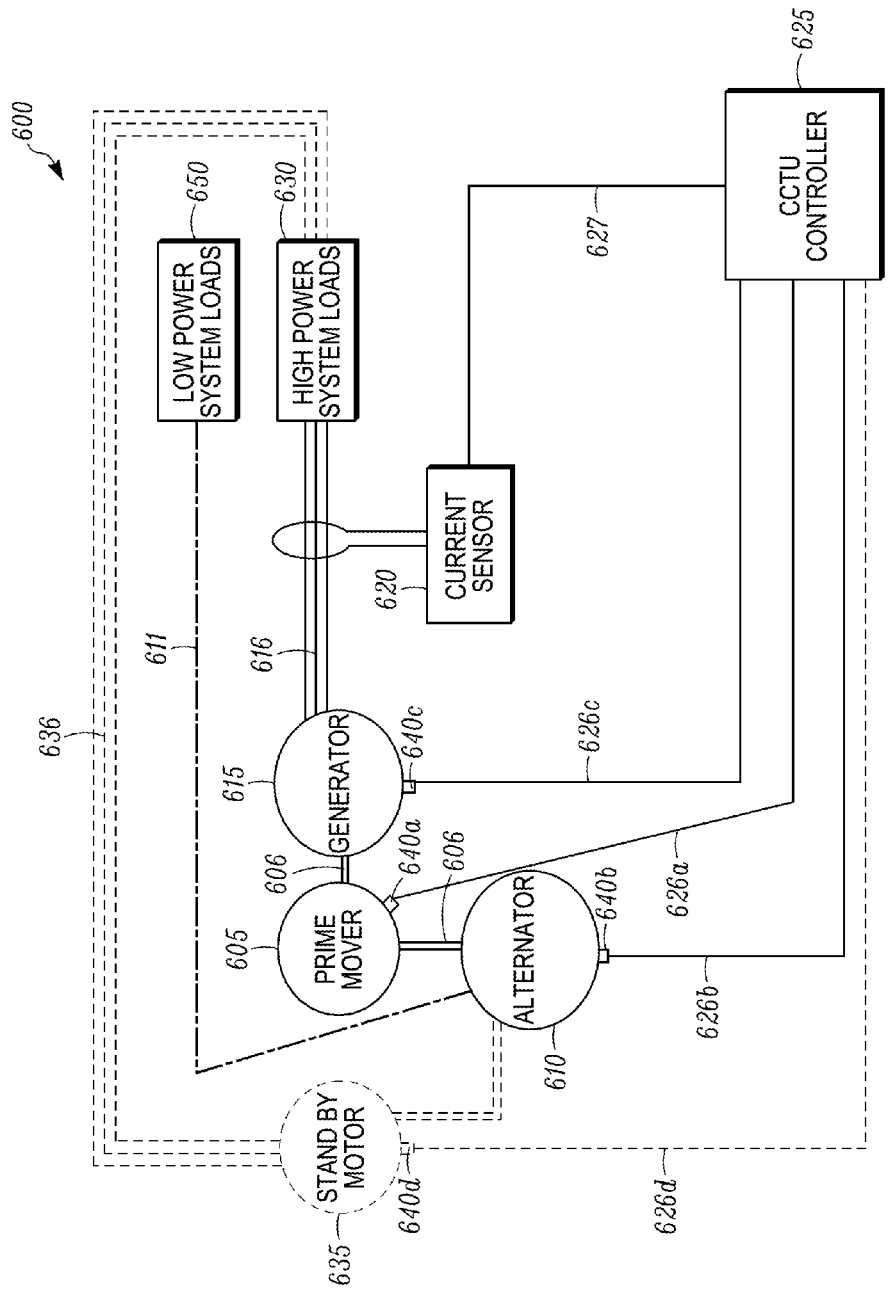
FIG. 6 is a block diagram of a system for detecting an electrical phase loss condition, according to one embodiment.

FIG. 6 illustrates a block diagram of one embodiment of an electrical phase loss detection system 600 of a CCTU such as the CCTU 101 shown in FIG. 1. The electrical phase loss detection system 600 includes a plurality of reference signal components including a prime mover 605, an alternator 610, a generator 615 and optionally a standby electric drive motor 635. The electrical phase loss detection system 600 also includes a current sensor 620, a CCTU controller 625, one or more high power system loads 630, one or more low power system loads 650, and a plurality of reference sensors 640.

The prime mover 605 is configured to provide mechanical energy 606 to drive the alternator 610 and the generator 615. In some embodiments, the prime mover 605 can be a diesel prime mover. In some embodiments, the prime mover 605 can be an engine that uses a fuel type other than diesel (e.g., natural gas, regular gas, etc.). In some embodiments, the prime mover 605 can be an electrical standby motor. Particularly, in some embodiments, the prime mover 605 can be an electrically controlled engine that is controlled by an internal electronic engine control unit (ECU) (not shown). The ECU can be configured to regulate an amount of fuel delivered to the prime mover 605 and can be configured to operate the prime mover 605 at multiple speeds. The ECU is generally configured to allow the prime mover 605 to be maintained at a chosen speed regardless of the system loads seen by the prime mover 605. The ECU can be controlled by the CCTU controller 625 and powered by the alternator 610 (not shown). In some embodiments, the prime mover 605 is a ~12 horsepower (HP) engine. In other embodiments, the prime mover 605 is a ~19 HP engine.

The alternator 610 is configured to convert the mechanical energy 606 provided by the prime mover 605 and provide electrical energy to power the low power system loads 650. In particular, the alternator 610 is configured to provide DC electrical power 611 to the low power system loads 650. The low power system loads 650 can include, for example, a battery (e.g., the battery 160 shown in FIG. 2, one or more sensors (e.g., the current sensor 620, the reference sensors 640, etc.), the CCTU controller 625, one or more third party devices, a telematics unit, etc. In some embodiments, the alternator 610 can be configured to provide about 1500 W DC electrical power to the low power system loads 650.

The generator 615 is configured to convert the mechanical energy 606 provided by the prime mover 605 and provide electrical energy to power the high power system loads 630. In particular, the generator 615 is configured to provide three phase AC electrical power 616 to the high power system loads 630. The high power system loads 630 can include, for example, a compressor (e.g., the compressor 115 shown in FIG. 2) of the CCTU, one or more fans (e.g., one or more compressor fans, one or more evaporator blowers, etc.) (not shown) of the CCTU, a drain tube heater (not shown) of the CCTU, etc. In some embodiments, the generator 615 can be configured to provide about 3-5 kW AC electrical power to the high power system loads 630.

The optional standby electric drive motor 635 can be configured to provide three phase AC electrical power 636 to the alternator 610 and/or the high power system loads 630. In some embodiments, the optional standby electric drive motor 635 is configured to power the one or more high power system loads 630 of the CCTU when the prime mover 605 is not running. In some embodiments, the optional standby electric drive motor 635 can be a three-phase AC motor.

The current sensor 620 is configured to monitor phase outputs from the generator 615 and send a generator phase signal 627 that includes a generator phase of phase outputs of the generator 615 to the CCTU controller 625. In some embodiments, the phases of the generator 615 are wound in the current sensor 620 (as discussed above with respect to FIGS. 4-5), and the generator phase signal 627 outputted by the current sensor 620 is a vector sum of the three phase electrical power.

The reference sensors 640 are configured to monitor a specific component of the electrical phase loss detection system 600 and to send a reference signal 626a-d to the CCTU controller 625. In some embodiments, the reference sensors 640 can be speed sensors configured to monitor a RPM speed of the specific reference signal component and send a reference signal 640 that is based on the RPM of the specific reference signal component to the CCTU controller 625. For example, the reference sensor 640a can be a speed sensor configured to monitor a speed of the prime mover 605. The reference sensor 640b can be a speed sensor configured to monitor a speed of the alternator 610. The reference sensor 640c can be a speed sensor configured to monitor a speed of the generator 615. Optionally, when the standby electric drive motor 635 is present, the optional reference sensor 640d can be a speed sensor configured to monitor a speed of the standby electric drive motor 635. Also, in some embodiments, the reference sensor 640b and/or the reference sensor 640d can be phase winding sensors configured to monitor a phase winding of the alternator 610 and/or the standby electric drive motor 635 to obtain a reference signal. It is appreciated that any or all of the reference sensors 640 can be used to send a reference signal to the CCTU controller 625. For example, in one embodiment, only the reference sensor 740a is used to send the reference signal to the CCTU controller 725. In another embodiment, the reference sensors 740a, b and c are used to send the reference signal to the CCTU controller 725. The reference signals 626a-d can provide a static time base so that the phase shift between the generator signal 627 and the reference signals 626a-d is constant during no fault conditions.

While the embodiment shown in FIG. 6 includes a reference sensor for each of the prime mover 605, the alternator 610, the generator 615 and the standby electric drive motor 635, it is appreciated that in other embodiments, the number of these components having a reference sensor 640 may vary as long as at least one of these components includes a reference sensor 640. Also, it will be appreciated that, at a minimum, at least one of the reference sensors 640 is configured to send a reference signal to the CCTU controller 625.

The CCTU controller 625 is an electronic device that is configured to manage, command, direct, and regulate the behavior of one or more CCTU refrigeration components of a refrigeration circuit. In some embodiments, the CCTU controller 625 is particularly configured to obtain the generator phase signal from the current sensor 620 and a reference signal from at least one of the reference sensors 640. As discussed in more detail below with respect to FIGS. 7 and 8, the CCTU controller 625 is configured to use the generator phase signal and the reference signal to determine if an electrical phase loss condition has occurred. If the CCTU controller 625 determines that an electrical phase loss condition has occurred, the CCTU controller 625 is configured to modify operation of the CCTU and trigger one or more alarms to inform, for example, the CCTU operator that an electrical phase loss condition has occurred.

Figure 7:
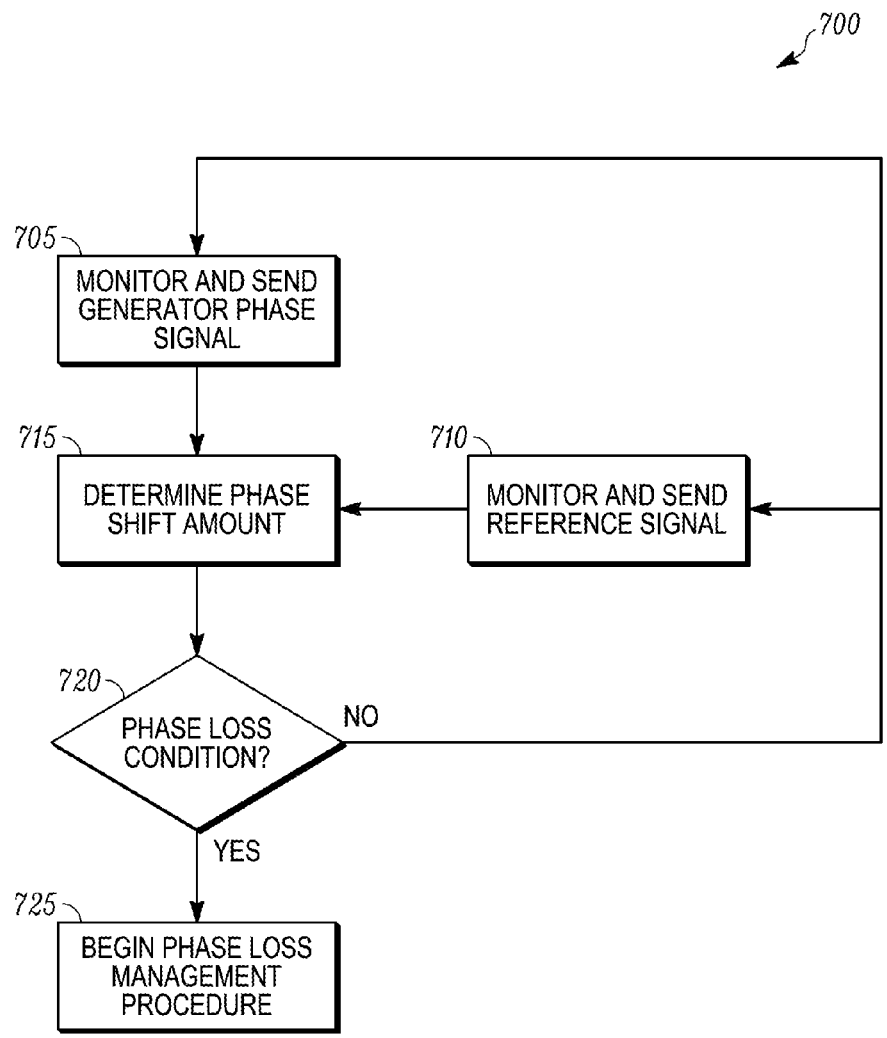
FIG. 7 is a flow diagram of a method for detecting an electrical phase loss condition using the electrical phase loss detection system shown in FIG. 6, according to a first embodiment.

FIG. 7 illustrates a flowchart of one embodiment of a method 700 for detecting an electrical phase loss condition using the electrical phase loss detection system 600. At 705, the current sensor 620 monitors and sends a generator phase signal 627 to the CCTU controller 625.

At 710, one or more of the reference sensors 640 monitors and sends a reference signal 626 to the CCTU controller 625. In some embodiments, the reference signal can be based on a RPM speed obtained from one or more of the reference components including, for example, the prime mover 605, the alternator 610, the generator 615 and optionally the standby electric drive motor 635. It will be appreciated that the reference signal remains consistent during normal operation and during an electrical phase loss condition.

At 715, the CCTU controller 625 is configured to calculate a phase shift amount between the reference signal and the generator phase signal. At 720, the CCTU controller 725 is configured to determine whether an electrical phase loss condition has occurred based on the phase shift amount between the reference signal and the generator phase signal. If the CCTU controller 625 determines that an electrical phase loss condition has occurred, the method 700 proceeds to 725. If the CCTU controller 625 determines that an electrical phase loss condition has not occurred, the method 700 proceeds back to 705 and 710.

By using a reference signal and a generator phase signal to determine an electrical phase loss condition, the method 700 can remove a frequency dependency when determining whether an electrical phase loss condition has occurred.

At 725, the CCTU controller 625 begins an electrical phase loss management procedure. In some embodiments, this can include operating the CCTU in a limp-home mode. This can include alerting an operator or user that an electrical phase loss condition has been detected. This can also include alerting the operator or user not to turn off the CCTU and to return to a maintenance facility as soon as possible. Further, this can include the CCTU controller 625 preventing a shutdown or restart event of the CCTU until the CCTU reaches a maintenance facility and/or a cargo facility so that maintenance can be performed on the CCTU without any cargo being ruined.

Figure 8:
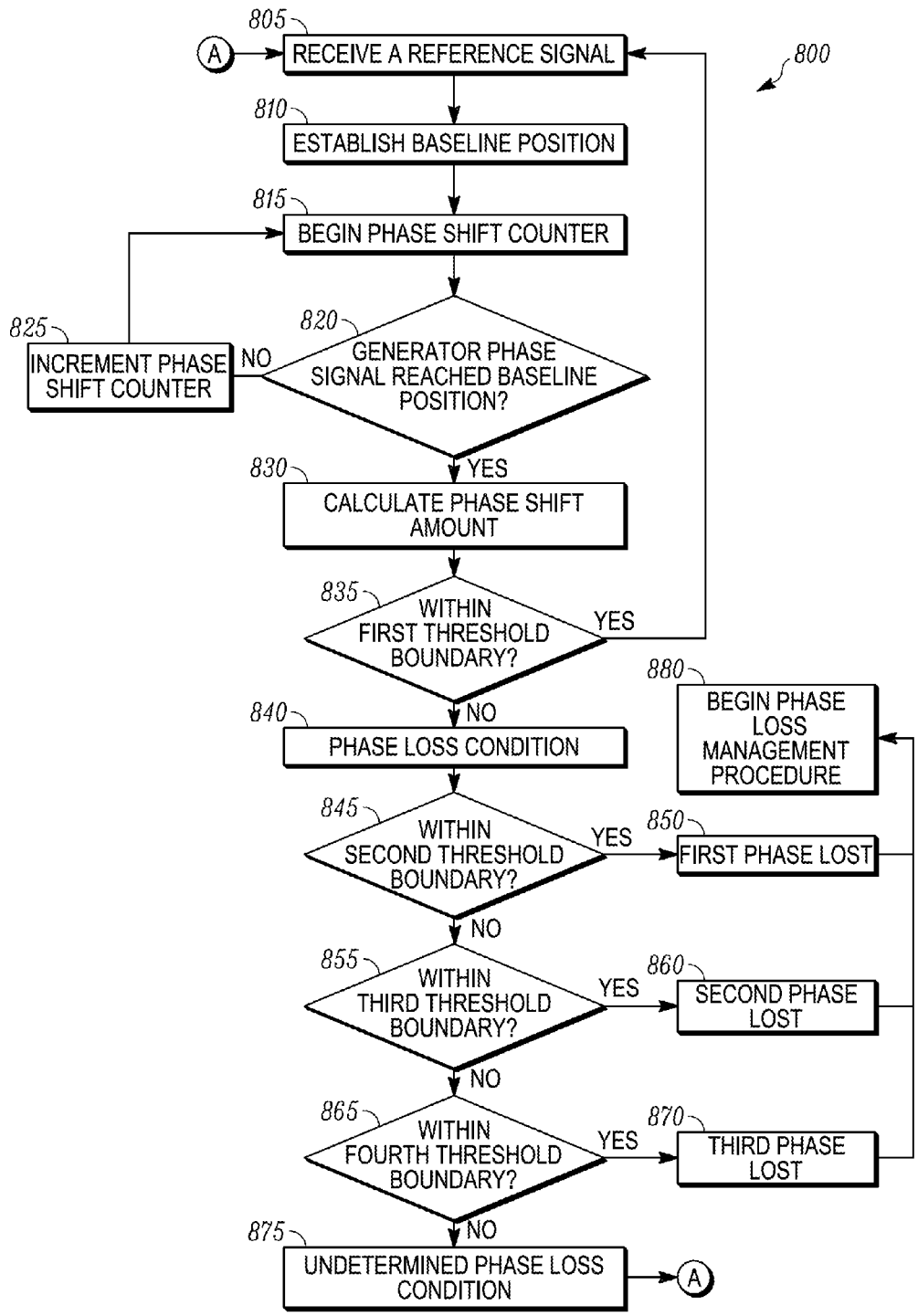
FIG. 8 is a flow diagram of a method for detecting an electrical phase loss condition using the electrical phase loss detection system shown in FIG. 6, according to a second embodiment.

FIG. 8 illustrates a flowchart of another embodiment of a method 800 for detecting an electrical phase loss condition using the electrical phase loss detection system 600. At 805, the CCTU controller 625 receives a reference signal 626 from one or more of the reference sensors 640 of the electrical phase loss detection system 600. At 810 the CCTU controller 625 establishes a baseline position within the reference signal 626. For example, in some embodiments the CCTU 625 can digitize the reference signal 626 into a square waveform reference signal and the baseline position can be a low to high transition of the square waveform reference signal. In other embodiments, the baseline position can be at a different position of the reference signal including, for example, a zero crossing of the reference signal, a high to low transition of the reference signal, etc. That is, the baseline position can be at any position of the reference signal as long as it can be consistently applied.

At 815, the CCTU controller 625 monitors the generator phase signal 627 received from the current sensor 620 and the CCTU controller 625 begins a phase shift counter (e.g., the phase shift counter 215 shown in FIG. 3). The method 800 then proceeds to 820.

At 820, the CCTU controller 625 determines whether the generator phase signal 627 has reached the baseline position. For example, in some embodiments, the CCTU controller 625 can digitize the generator phase signal 627 into a square waveform generator phase signal and the CCTU controller 625 can determine that the square waveform generator phase signal has reached 15 the baseline position when the square waveform generator phase signal has gone from a low to high transition. If the generator phase signal 627 has reached the baseline position, the method 800 proceeds to 830. If the generator phase signal 627 has not reached the baseline position, the CCTU controller 625 the method 800 proceeds to 825. At 825 the CCTU controller 825 increments the phase shift counter and the method 800 proceeds back to 820.

At 830, the phase shift counter of the CCTU controller 625 calculates a phase shift amount based on the number of times the phase shift counter was incremented and a frequency of the generator phase signal 627. At 835, the CCTU controller 625 determines whether the phase shift amount is within a first threshold boundary. That is, the CCTU controller 625 determines whether a phase loss condition has occurred. For example, a phase shift amount when no phase loss condition has occurred can be, for example, about 130°. Accordingly, in some embodiments, the first threshold boundary can be about ±10° from 130°. That is, as long as the calculated phase shift amount calculates a phase within a window between ~120° to ~140°, the phase shift amount is within the first threshold boundary.

If the phase shift amount is within the first threshold boundary, an electrical phase loss condition has not occurred and the method 800 proceeds back to 805. If the phase shift amount is not within the first threshold boundary, the method 800 proceeds to 840. At 840 the CCTU controller 625 determines that an electrical phase loss condition has occurred and the method 800 proceeds to 845.

By using the reference signal 626 and the generator phase signal 627 to determine an electrical phase loss condition, the method 800 can remove a frequency dependency when determining whether an electrical phase loss condition has occurred.

At 845, the CCTU controller 625 determines whether the phase shift amount is within a second threshold boundary. In some embodiments, the second threshold boundary can be about ±20° from 130°. That is, if the calculated phase shift amount calculates a phase that is between ~110° to ~120° or between ~140° to ~150°, the phase shift amount is within the second threshold boundary. If the phase shift amount is within the second threshold boundary, the method 800 proceeds to 850. If the phase shift amount is not within the second threshold boundary, the method 800 proceeds to 855.

At 850, the CCTU controller 625 determines that a first phase of the three phase generator signal 627 is lost and the method 800 proceeds to 880.

At 855, the CCTU controller 625 determines whether the phase shift amount is within a third threshold boundary. In some embodiments, the third threshold boundary can be about ±30° from 130°. That is, if the calculated phase shift amount calculates a phase that is between ~100° to ~110° or between ~150° to ~160°, the phase shift amount is within the third threshold boundary. If the phase shift amount is within the third threshold boundary, the method 800 proceeds to 860. If the phase shift amount is not within the third threshold boundary, the method 800 proceeds to 865.

At 860, the CCTU controller 625 determines that a second phase of the three phase generator signal 627 is lost and the method 800 proceeds to 880.

At 865, the CCTU controller 625 determines whether the phase shift amount is within a fourth threshold boundary. In some embodiments, the fourth threshold boundary can be about ±30° from 130°. That is, if the calculated phase shift amount calculates a phase that is between ~90° to ~100° or between ~160° to ~170°, the phase shift amount is within the fourth threshold boundary. If the phase shift amount is within the fourth threshold boundary, the method 800 proceeds to 870. If the phase shift amount is not within the fourth threshold boundary, the method 800 proceeds to 875.

At 870, the CCTU controller 625 determines that a third phase of the three phase generator signal 627 is lost and the method 800 proceeds to 880.

At 875, the CCTU controller 625 has found an undetermined generator signal electrical phase loss condition and the method 800 returns to 805.

At 880, the CCTU controller 625 begins an electrical phase loss management procedure based on whether a first, second or third phase of the three phase generator signal 627 is lost. In some embodiments, this can include operating the CCTU in a limp-home mode. This can include alerting an operator or user that an electrical phase loss condition has been detected and can include alerting the operator or user of the particular phase of the three phase generator signal 627 that has been lost when the particular lost phase is known or there is an undetermined generator electrical phase loss condition when the particular phase of the three phase generator signal 627 is unknown. This can also include alerting the operator or user not to turn off the CCTU 600 and to return to a maintenance facility as soon as possible. Further, this can include the CCTU controller 625 preventing a shutdown or restart event of the CCTU 600 until maintenance can be performed on the CCTU 600.

Figure 9:
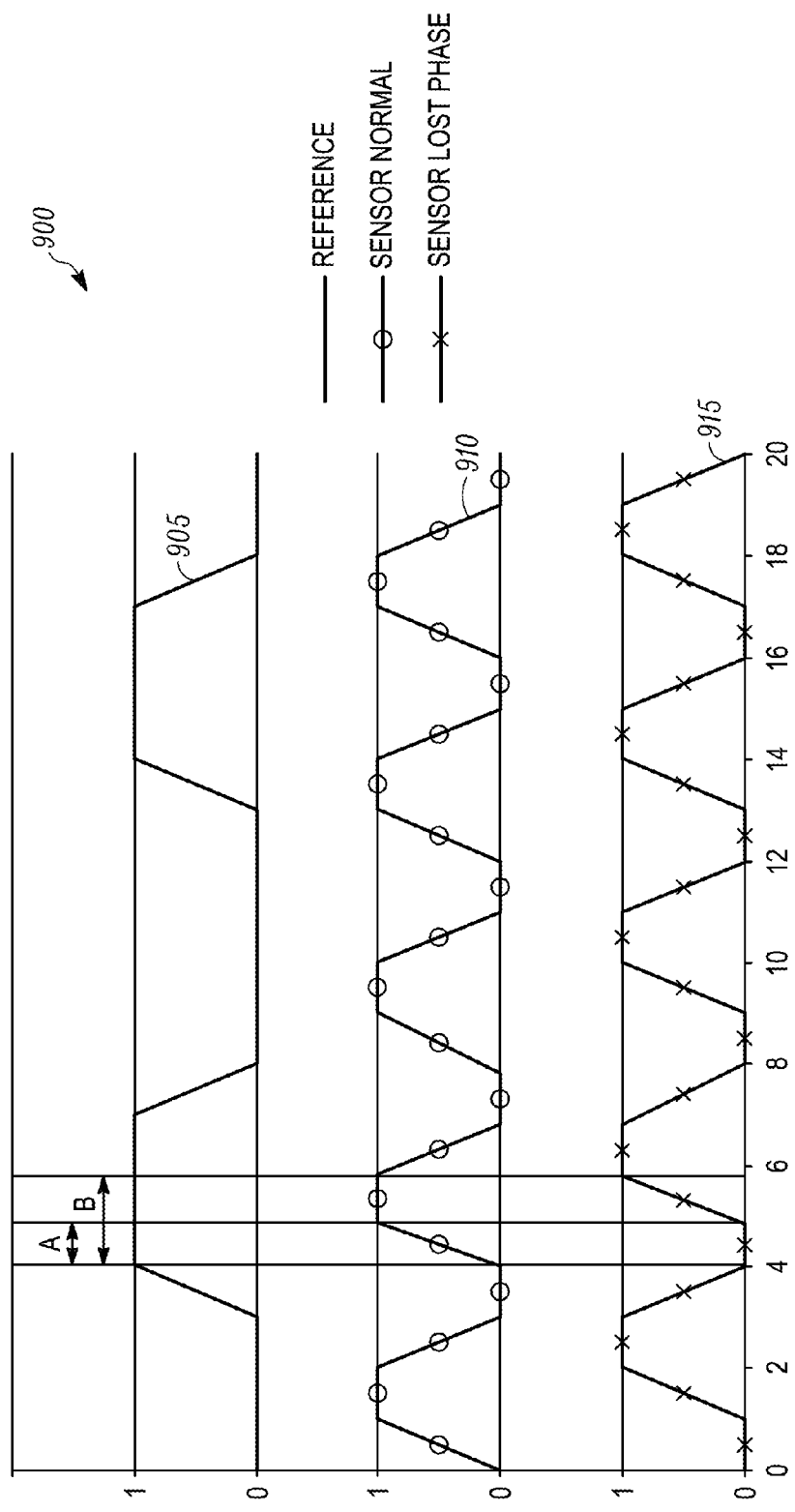
FIG. 9 is a graph of a reference signal waveform, a generator phase signal without a phase loss condition, and a generator phase signal with a phase loss condition, according to one embodiment.

FIG. 9 is a graph 900 of a reference signal waveform 905, a generator phase signal 910 without an electrical phase loss condition, and a generator phase signal 915 with an electrical phase loss condition, according to one embodiment. During normal operating conditions of a CCTU (e.g., the CCTU 600) when no electrical phase loss condition has occurred, a phase shift amount A can be expected. In some embodiments, the phase shift amount A can be about 10°. However, as shown by the generator phase signal 915 with a phase shift amount B that is greater than the phase shift amount A, a CCTU controller (e.g., the CCTU controller 625) can determine that an electrical phase loss condition has occurred.

An advantage of these embodiments is that a controller of a CCTU can determine when an electrical phase loss occurs and execute an electrical phase loss management procedure that can alert the operator that the CCTU may not be capable of operating at its fully capacity and prevent an undesirable shutdown and/or restart event that could result in the CCTU from being unable to maintain a desired environmental condition that could lead to lost cargo. The embodiments described herein can also remove a frequency dependency when determining whether an electrical phase loss condition has occurred.

Aspects

It is noted that any of aspects 1-6, 7-15 and 16-24 can be combined.

Aspect 1. A method for detecting and managing an electrical phase loss condition in a climate controlled transport unit (CCTU), comprising:

monitoring a generator phase signal outputted from a generator of the CCTU;

calculating, via a CCTU controller, a phase shift amount based on the generator phase signal;

detecting an electrical phase loss condition based on the phase shift amount.

Aspect 2. The method according to aspect 1, further comprising:

monitoring a reference signal from a component of the CCTU; and calculating the phase shift amount based on the generator phase signal and the reference signal.

Aspect 3. The method according to any of aspects 1-2, further comprising the CCTU controller executing an electrical phase loss management procedure when the electrical phase loss condition is detected.

Aspect 4. The method according to aspect 3, wherein executing the electrical phase loss management procedure includes:

the controller alerting an operator that an electrical phase loss condition is detected, and the controller preventing a shutdown event and/or a restart event of the CCTU until the CCTU reaches a cargo facility and/or a maintenance facility.

Aspect 5. The method according to any of aspects 1-5, wherein detecting an electrical phase loss condition based on the phase shift amount includes:

the controller determining a first phase of the generator phase signal is lost when the phase shift amount is within a first threshold boundary;

the controller determining a second phase of the generator phase signal is lost when the phase shift amount is within a second threshold boundary; and the controller determining a third phase of the generator phase signal is lost when the phase shift amount is within a third threshold boundary.

Aspect 6. The method according to aspect 5, further comprising:

the controller determining an undetermined electrical phase loss condition of the generator phase signal when the phase shift amount is outside of the first threshold boundary, the second threshold boundary and the third threshold boundary.

Aspect 7. A electrical phase loss detection system for a climate controlled transport unit (CCTU), the electrical phase loss detection system comprising:

a generator configured to output a generator phase signal;

a current sensor configured to monitor a generator phase signal outputted by the generator; and a controller configured to detect an electrical phase loss condition based on the generator phase signal.

Aspect 8. The electrical phase loss detection system according to aspect 7, wherein the controller is configured to calculate a phase shift amount based on the generator phase signal and a reference signal and is configured to detect the electrical phase loss condition based on the calculated phase shift amount.

Aspect 9. The electrical phase loss detection system according to any of aspects 7-8, wherein the controller is configured to execute an electrical phase loss management procedure when the electrical phase loss condition is detected.

Aspect 10. The electrical phase loss detection system according to any of aspects 7-9, wherein when the electrical phase loss condition is detected, the controller is configured to:

alert an operator that an electrical phase loss condition is detected, and prevent a shutdown event and/or a restart event of the CCTU until the CCTU reaches a cargo facility and/or a maintenance facility.

Aspect 11. The electrical phase loss detection system according to any of aspects 7-10, wherein when the controller detects an electrical phase loss condition, the controller is configured to:

determine a first phase of the generator phase signal is lost when the phase shift amount is within a first threshold boundary;

determine a second phase of the generator phase signal is lost when the phase shift amount is within a second threshold boundary; and determine a third phase of the generator phase signal is lost when the phase shift amount is within a third threshold boundary.

Aspect 12. The electrical phase loss detection system according to aspect 11, wherein the controller is configured to determine an undetermined electrical phase loss condition of the generator phase signal when the phase shift amount is outside of the first threshold boundary, the second threshold boundary and the third threshold boundary.

Aspect 13. The electrical phase loss detection system according to aspect 8, further comprising:

a prime mover configured to power one or more system loads of the CCTU;

a reference sensor configured to monitor the reference signal from the prime mover and send the reference signal to the controller.

Aspect 14. The electrical phase loss detection system according to aspect 8, further comprising:

an alternator configured to convert mechanical energy generated by a prime mover into electrical energy;

a reference sensor configured to monitor the reference signal from the alternator and send the reference signal to the controller.

Aspect 15. The electrical phase loss detection system according to aspect 8, further comprising:

a standby electric drive motor configured to power one or more system loads of the CCTU;

a reference sensor configured to monitor the reference signal from the standby electric drive motor and send the reference signal to the controller.

Aspect 16. A climate controlled transport unit (CCTU) comprising:

a transport unit;

a transport refrigeration system TRS) for controlling an environmental condition within the transport unit;

a prime mover configured to power the TRS;

a generator configured convert mechanical energy generated by the prime mover into electrical energy, wherein the electrical energy is outputted as a generator phase signal;

a current sensor configured to monitor the generator phase signal outputted by the generator; and a controller configured to detect an electrical phase loss condition based on the generator phase signal.

Aspect 17. The CCTU according to aspect 16, wherein the controller is configured to calculate a phase shift amount based on the generator phase signal and a reference signal and is configured to detect the electrical phase loss condition based on the calculated phase shift amount.

Aspect 18. The CCTU according to any of aspects 16-17, wherein the controller is configured to execute an electrical phase loss management procedure when the electrical phase loss condition is detected.

Aspect 19. The CCTU according to any of aspects 16-18, wherein when the electrical phase loss condition is detected, the controller is configured to:

alert an operator that an electrical phase loss condition is detected, and prevent a shutdown event and/or a restart event of the CCTU until the CCTU reaches a cargo facility and/or a maintenance facility.

Aspect 20. The CCTU according to any of aspects 16-19, wherein when the controller detects an electrical phase loss condition, the controller is configured to:

determine a first phase of the generator phase signal is lost when the phase shift amount is within a first threshold boundary;

determine a second phase of the generator phase signal is lost when the phase shift amount is within a second threshold boundary; and determine a third phase of the generator phase signal is lost when the phase shift amount is within a third threshold boundary.

Aspect 21. The CCTU according to aspect 20, wherein the controller is configured to determine an undetermined electrical phase loss condition of the generator phase signal when the phase shift amount is outside of the first threshold boundary, the second threshold boundary and the third threshold boundary.

Aspect 22. The CCTU according to aspect 17, further comprising:

a reference sensor configured to monitor the reference signal from the prime mover and send the reference signal to the controller.

Aspect 23. The CCTU according to aspect 17, further comprising:

an alternator configured to convert mechanical energy generated by the prime mover into electrical energy;

a reference sensor configured to monitor the reference signal from the alternator and send the reference signal to the controller.

Aspect 24. The CCTU according to aspect 17, further comprising:

a standby electric drive motor configured to power the TRS when the prime mover is not running;

a reference sensor configured to monitor the reference signal from the standby electric drive motor and send the reference signal to the controller.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

The invention claimed is:

1. A method for detecting and managing an electrical phase loss condition in a climate controlled transport unit (CCTU), comprising:

monitoring, via a current sensor, electrical power having multiple phases outputted by a generator of the CCTU, the current sensor outputting a generator phase signal indicative of the multiple phases of the electrical power;

calculating, via a CCTU controller, a phase shift amount based on the generator phase signal;

detecting an electrical phase loss condition based on the phase shift amount; and executing, via the CCTU controller, an electrical phase loss management procedure when the phase loss condition is detected, the electrical phase loss management procedure including the CCTU controller generating an alert that the electrical phase loss condition is detected.

2. The method according to claim 1, further comprising:
monitoring a reference signal from a component of the CCTU; and
calculating the phase shift amount based on the generator phase signal and the reference signal.

3. The method according to claim 1, wherein executing the electrical phase loss management procedure includes:
the CCTU controller preventing a shutdown event and/or a restart event of the CCTU until the CCTU reaches a cargo facility and/or a maintenance facility.

4. The method according to claim 1, wherein detecting the electrical phase loss condition based on the phase shift amount includes:
the CCTU controller determining a first phase of the generator phase signal is lost when the phase shift amount is within a first threshold boundary;
the CCTU controller determining a second phase of the generator phase signal is lost when the phase shift amount is within a second threshold boundary; and
the CCTU controller determining a third phase of the generator phase signal is lost when the phase shift amount is within a third threshold boundary.

5. The method according to claim 4, further comprising:
the CCTU controller determining an undetermined electrical phase loss condition of the generator phase signal when the phase shift amount is outside of the first threshold boundary, the second threshold boundary and the third threshold boundary.

6. A electrical phase loss detection system for a climate controlled transport unit (CCTU), the electrical phase loss detection system comprising:
a generator configured to convert mechanical energy generated by a prime mover into multiple phase power;
a current sensor configured to monitor the multiple phase power and output a generator phase signal indicative of the multiple phase power outputted by the generator; and
a controller configured to detect an electrical phase loss condition based on the generator phase signal, the controller also being configured to generate an alert when an electrical phase loss condition is detected.

7. The electrical phase loss detection system according to claim 6, wherein the controller is configured to calculate a phase shift amount based on the generator phase signal and a reference signal and is configured to detect the electrical phase loss condition based on the calculated phase shift amount.

8. The electrical phase loss detection system according to claim 7, further comprising:
a reference sensor configured to monitor the reference signal from the prime mover and send the reference signal to the controller, wherein the prime mover is configured to power one or more system loads of the CCTU.

9. The electrical phase loss detection system according to claim 7, further comprising:
an alternator configured to convert mechanical energy generated by the prime mover into electrical energy;
a reference sensor configured to monitor the reference signal from the alternator and send the reference signal to the controller.

10. The electrical phase loss detection system according to claim 7, further comprising:
a standby electric drive motor configured to power one or more system loads of the CCTU;
a reference sensor configured to monitor the reference signal from the standby electric drive motor and send the reference signal to the controller.

11. The electrical phase loss detection system according to claim 6, wherein the controller is configured to execute an electrical phase loss management procedure when the electrical phase loss condition is detected.

12. The electrical phase loss detection system according to claim 6, wherein when the electrical phase loss condition is detected, the controller is configured to:
prevent a shutdown event and/or a restart event of the CCTU until the CCTU reaches a cargo facility and/or a maintenance facility.

13. A climate controlled transport unit (CCTU) comprising:
a transport unit;
a transport refrigeration system (TRS) for controlling an environmental condition within the transport unit;
a prime mover configured to power the TRS;
a generator configured convert mechanical energy generated by the prime mover into electrical energy, wherein the electrical energy is outputted as multiple phase electrical power;
a current sensor configured to monitor the multiple phase electrical power and output a generator phase signal; and
a controller configured to detect an electrical phase loss condition based on the generator phase signal.

14. The CCTU according to claim 13, wherein the controller is configured to calculate a phase shift amount based on the generator phase signal and a reference signal and is configured to detect the electrical phase loss condition based on the calculated phase shift amount.

15. The CCTU according to claim 14, further comprising:
an alternator configured to convert mechanical energy generated by the prime mover into electrical energy;
a reference sensor configured to monitor the reference signal from the alternator and send the reference signal to the controller.

16. The CCTU according to claim 14, further comprising:
a standby electric drive motor configured to power the TRS when the prime mover is not running;
a reference sensor configured to monitor the reference signal from the standby electric drive motor and send the reference signal to the controller.

17. The CCTU according to claim 13, wherein the controller is configured to execute an electrical phase loss management procedure when the electrical phase loss condition is detected.

18. The CCTU according to claim 13, wherein when the electrical phase loss condition is detected, the controller is configured to:
alert an operator that an electrical phase loss condition is detected, and
prevent a shutdown event and/or a restart event of the CCTU until the CCTU reaches a cargo facility and/or a maintenance facility.

19. The CCTU according to claim 14, further comprising:
a reference sensor configured to monitor the reference signal from the prime mover and send the reference signal to the controller.

* * * * *